March 7, 1933. H. FERGUSON 1,900,440
CULTIVATOR
Filed Sept. 15, 1930 3 Sheets-Sheet 3
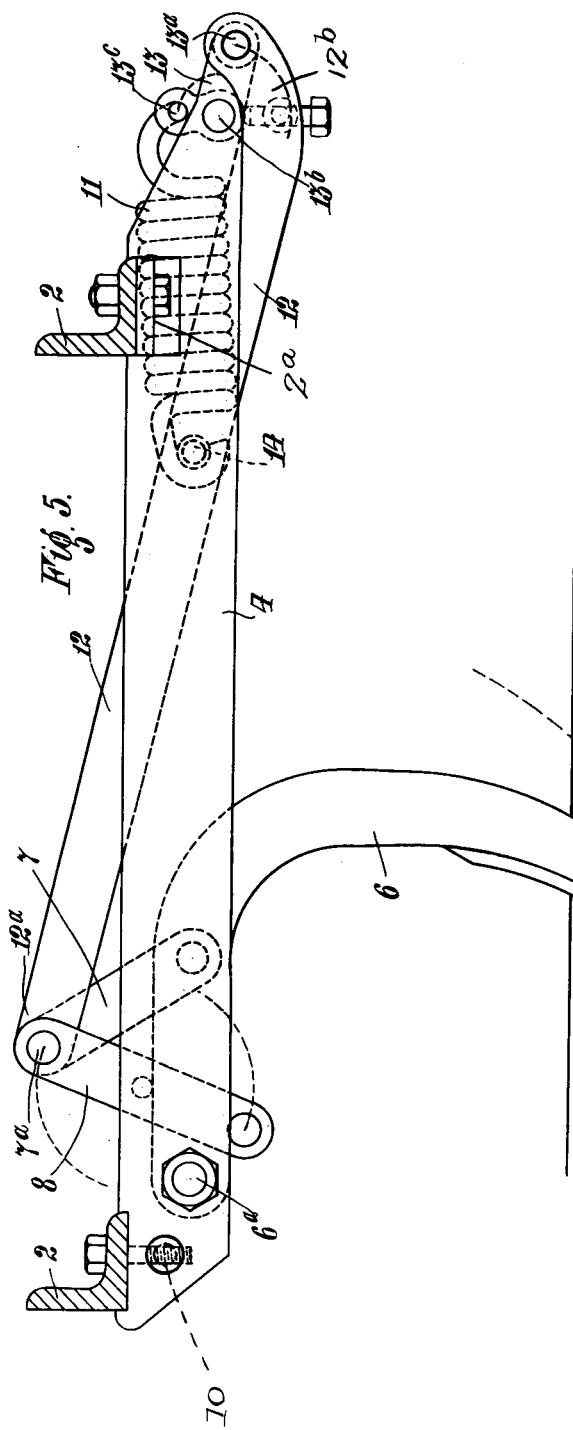
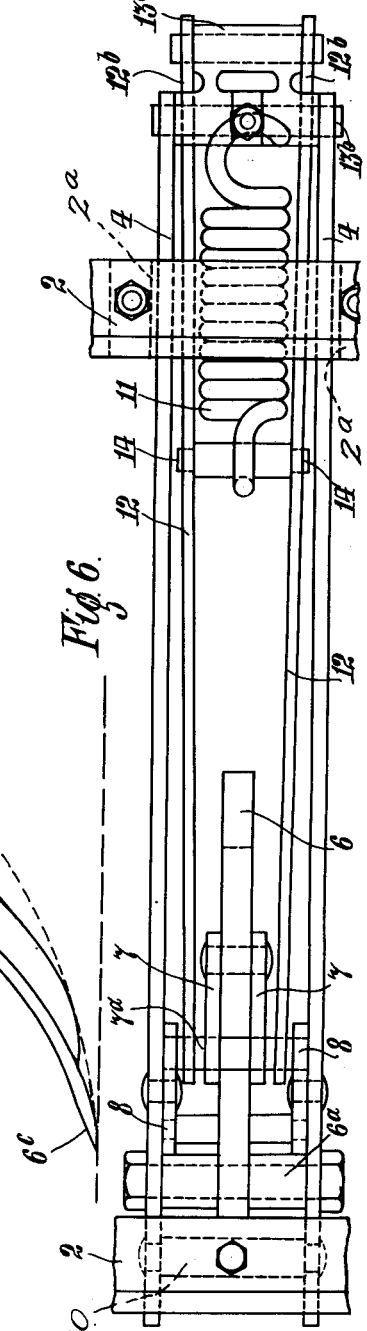
INVENTOR
H. FERGUSON
BY
ATTY.

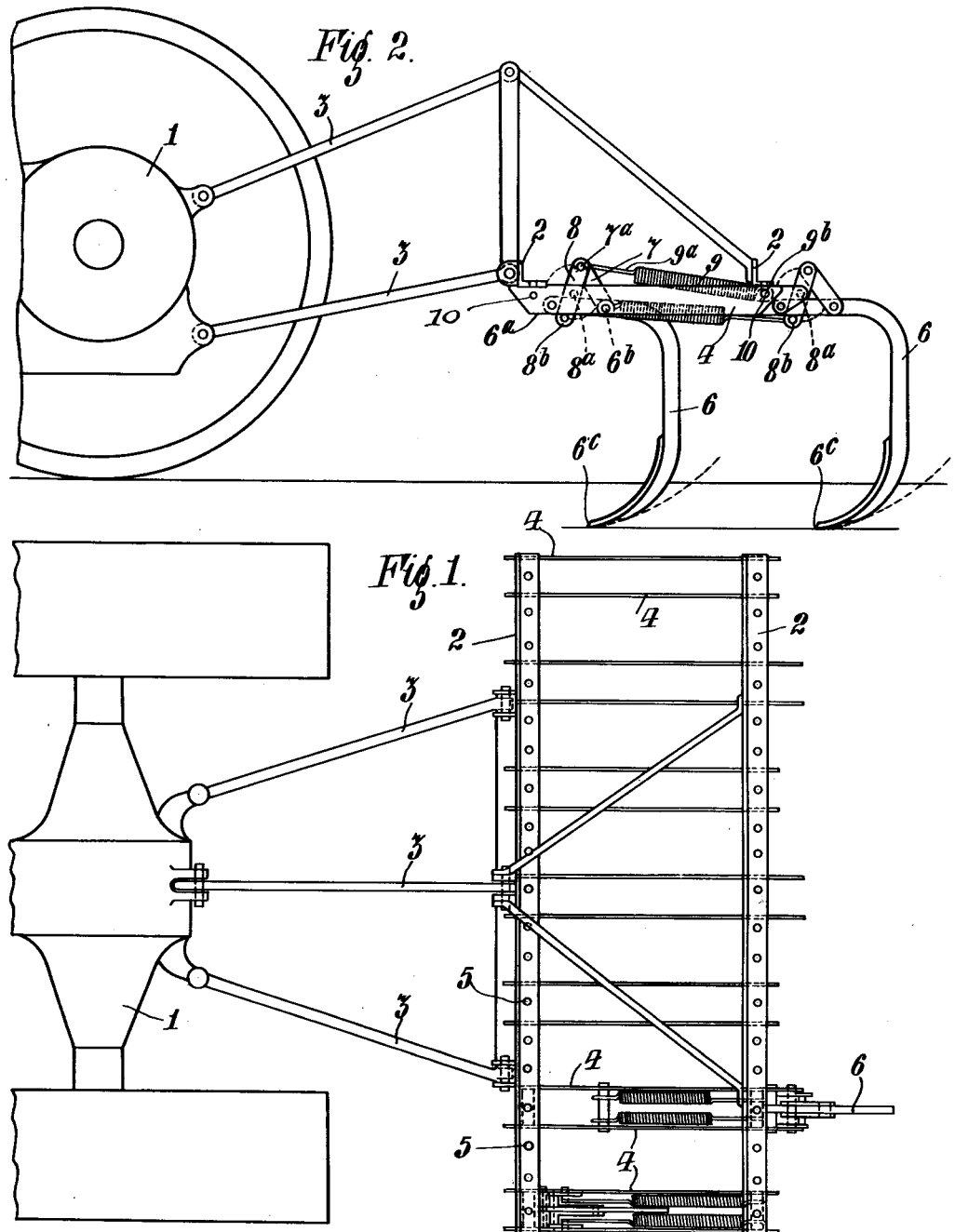

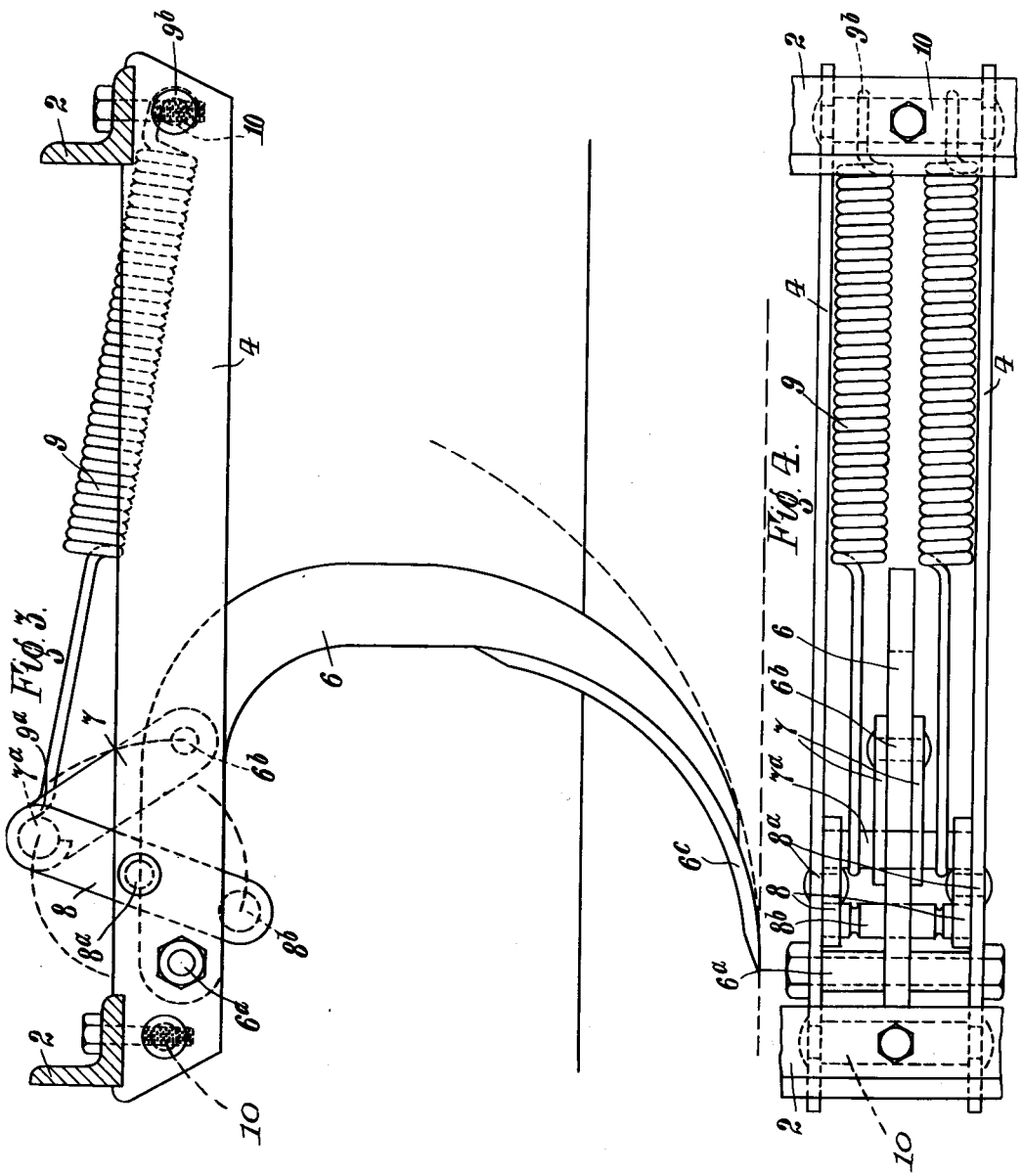

Patented Mar. 7, 1933

1,900,440

UNITED STATES PATENT OFFICE

HARRY FERGUSON, OF BELFAST, NORTHERN IRELAND

CULTIVATOR

Application filed September 15, 1930, Serial No. 482,058, and in Great Britain September 20, 1929.

This invention relates to horse-drawn and tractor cultivators of all types, and has for its object the improvement of cultivators generally, so as to ensure more economical land cultivation under all conditions.

Hitherto, cultivators have been of two types—the rigid tine, and those fitted with several types of automatic releasing tines when the ground cultivating shovel encounters an obstruction.

The rigid tine cultivators and planters such as corn drills were fairly satisfactory with horses, but have been a very real obstruction to the development of the tractor for land cultivation. When a rigid tine caught an obstruction, the increased power from the tractor, as compared with horses, broke or bent the tine. Manufacturers then resorted to spring releases, or safety wooden pin devices, at the connection between tractor and implement but these are most unsatisfactory, because, owing to the wide cut which a tractor cultivator or planter takes, the tines continuously catch against obstructions, and re-fixing of the automatic release attachment involves a costly waste of time.

There is another serious objection to this form of release for, when the implement has been re-attached to the tractor, it has to be backed and lifted clear of the obstruction and the tractor has then to be moved forward until the implement has passed the obstruction. This means that a considerable portion of a field is not cultivated.

The field of experiment with spring tines is so wide that it is very difficult to cover it all. Many types of spring tines have been made which automatically release when an obstruction is encountered, but, for tractor work, these are particularly unsatisfactory. The cultivator should be run behind the tractor, and the operator may not know when a tine releases. Even if he does so, he is required to stop and push the tine back into position again, because no form of spring tine has yet been marketed which will automatically return to its work while the implement is still moving.

My investigation has shown that it is unsatisfactory to make tines (suitable for deep cultivation) return to their work, after encountering an obstruction, by pivoting them around a centre and connecting a strong spring to an extension beyond the pivot of the upper end of the tine as the length and weight of the spring required renders the same heavy, clumsy and quite uncommercial.

What the farmer really requires to meet his conditions and enable him to take advantage of tractors for cultivation, is a tine which will give all the advantages of the rigid type without its disadvantages.

According to this invention this requirement is met by providing a tine which offers enough resistance to the draft to allow the farmer to cultivate to any desired depth, but which, when an obstruction is encountered, is automatically displaced, and, after it has passed over the obstruction, automatically returns to its full working depth again without stopping the implement. The construction is also such that the whole implement can be of a very simple design and actually lighter than the ordinary rigid type cultivator.

The cultivator tine is characterized by means whereby it is positively returned to its working position without stopping the implement, after having been raised on encountering an obstruction, said means being preferably a combination of spring and lever or link mechanism, the parts being so combined and forming such a connection of the tine with its frame as to give the desired results.

In order to obtain the above results in a practical manner, the tine point is preferably located in or about the same vertical plane as the pivotal point of the tine, so that, when an obstruction is encountered, the tine moves backwards without penetrating more deeply. As it moves backwards it moves upwards to clear the obstruction and this movement lessens the work required by the returning mechanism.

Instead of connecting the spring returning mechanism directly to the tine, I preferably connect it through the medium of link mechanism, so arranged as to provide an extremely light and economical manufacturing design, and at the same time give the maximum leverage to enable a light-weight spring means to return the tine to its work again. Preferably, the spring means would be anchored at one end of the frame, whilst the other end would be connected to the link mechanism, the latter preferably comprising one or more links pivotally connected to the frame, and one or more links pivotally connected at one end to the beforementioned link or links, and at the other end pivotally connected to the tine. Preferably the link or links, pivotally connected with the frame, would be extended, to enable the spring means to be attached to the opposite end so that the same mechanism could be used for either a front or rear tine. This extension may also be used to provide a stopper for locating the working position of the tine.

Preferably I use a design of link mechanism for connecting the spring means with the tine, which, whilst giving the maximum pull on the tine to keep it in its working position, also automatically reduces this pull as the tine moves upwards on encountering an obstruction. In this way the double purpose is served of reducing the weight of the spring means and preventing the uprising tine raising the whole cultivator out of the ground, by the pressure of the raised tine on the obstruction.

Preferably I use two springs in my construction because, when doing such work as orchard cultivation, one of these springs can be easily detached, and there will be less damage to the roots of the trees when the tine encounters a root, owing to the lighter pressure exerted on the tine.

One of the advantages of this invention is that it can be so carried out in practice that each tine will be independent of any other tine on the implement; that is to say, each tine and its mechanism will be a separate unit. This will provide for very rapid lateral adjustment, and for very cheap manufacture. The lateral adjustment of the unit will be particularly valuable when the invention is used in combination with an implement made as a unit with and carried on the tractor, because the implement will then have no mechanism, such as wheels and the framework for carrying wheels to limit lateral adjustment.

It is obvious that, if pivot pins have to be a good fit for their bearings in order to give lateral rigidity they would rust and prevent the operation of the mechanism. This invention provides for very loose fits at all moving points, the spring means automatically taking up the looseness and giving great lateral stiffness, so that, when cultivating row crops, for example, the tines will be rigid laterally, and not enter the row crop.

The invention will now be described, by way of example, with reference to the accompanying drawings whereon a cultivator is shown attached to the rear to a tractor. The drawings also show different arrangements of the tines on the frame of the implement.

Fig. 1 is a plan view showing the rear of the tractor and showing a cultivator attached thereto, only two tine units being shown.

Fig. 2 is a side elevation of the cultivator and corresponding with the plan view shown on Fig. 1.

Fig. 3 is a detailed side elevation showing a tine unit in its working position, bolted to its frame and showing the spring means for returning the tine to its work after it has passed an obstruction.

Fig. 4 is a plan view corresponding to Fig. 3.

Fig. 5 shows a modification of the spring means.

Fig. 6 is a plan view corresponding to Fig. 5.

Referring to the drawings:—

1 is a tractor and 2 is the frame of the cultivator which is connected with the tractor by means of links 3. In the examples shown, the implement frame carries a plurality of tine units or supports which each consist of a pair of parallel bars 4 connected by cross pins 10 and attached by bolts, or otherwise, to the lateral bars of the frame 2.

The bars 4 serve to brace the frame 2, and are adjustable laterally across the bars of the frame 2.

In the examples shown, a number of holes 5 are provided giving different positions for the tine units.

Each tine support 4, 10 is provided with a tine carrying pivot 6ª and pivoted at a point 6ᵇ on the tine 6 is the lower end of a double link 7 the upper end of which is pivotally connected at 7ª to the upper end of an outer double link 8. The double link 8 is pivotally connected at or near its center at 8ª to the bars 4 and in the examples shown, a pin 8ᵇ is provided at the lower end of this double link 8 to form a stopper to locate or position the tine in its working position.

Attached to the pin 7a are the ends 9a of springs 9 whose other ends 9b are attached to the rear crosspin 10.

I have just described a forward tine, and the rear tine of a cultivator is similarly mounted as will be seen with reference to Figs. 1 and 2 except that the springs 9 instead of being attached at the point 7a are attached at the point 8b.

The point 6c of the tine is shown located in the same vertical plane as the pivot 6a. It is to be understood that the location of the point 6c is not limited to an exact vertical position, and may be forward of or in rear of the vertical plane passing through the pivot 6a. The arrangement shown is such that when an obstruction is encountered the tine will move backwards without penetrating more deeply.

An alternative method of applying the spring means is shown in Figs. 5 and 6. In this case a single spring is shown, and the single spring will be referred to, although two or more springs may be used if desired. The spring 11 is connected with the link mechanism 7, 8 through the medium of a double bar 12, having one end 12a connected with the pivot pin 7a, the other end 12b being connected to one end 13a of a rocker 13 which is pivotally mounted on a pin 13b carried by the end of the bars 4, the other end 13c of the rocker 13 having one end of the spring 11 attached to it, while the other end of the spring is attached to a pin 14 on the bars 12. Otherwise, the attachment of the tine to the bars 4 and to the link means 7, 8 corresponds with the arrangement shown on Figs. 3 and 4, the tine support in this case being completed by angle irons 2ᵃ whereby the rear ends of the bars 4 are bolted to the frame 2.

This arrangement provides for greatly increased resistance to the movement of the tine in its working position, without affecting the efficiency of the spring control means for allowing the tine to clear an obstruction and come back to its work again while the implement is in motion.

If the centers 13a, 13b and 7a were in alignment, then the tine 6 would be rigidly connected or locked in position, but by means of the toggle arrangement shown, it is possible to have the centers offset so that any desired degree of resistance to movement can be obtained before the spring means begin to extend. When the predetermined resistance is overcome, then the spring 11 and the link means 7 and 8 will come into action as described with reference to Figs. 3 and 4. Means of adjustment may be provided for varying the offset of the centers 13a, 13b and 7a, for instance, by means of a set-screw or wedge arrangement.

It will be observed that the same spring means are used for locking the toggle mechanism as are used for returning the tine to its work. This makes for economical manufacture and robust construction.

Whilst the arrangements shown refer only to spring means, it is understood that any other resilient means may be employed to effect the desired return of the tine to its working position, such, for example, as fluid pressure means.

It will be noted on Figs. 3 and 5 of the drawings that the arrangements shown give the maximum clearance below the tine carrying frame. This avoids the choking up of the implement in trashy ground.

As the tine moves backwards, it moves upwards from the position shown to clear the obstruction, and this movement lessens the work required by the tine-returning mechanism. If the point of the tine were considerably ahead of the vertical plane through the pivot 6a as in the case of former arrangements, then the tine in moving backwards round the pivot 6a would go deeper; the spring means when returning the tine to its work would have to force its point more deeply into the ground than its normal cultivating or working position, and the effect of this would be that the spring means would perhaps not be able to return the tine to its work while the implement was moving.

An outstanding feature of this invention is, therefore, that the point of the tine is in substantially vertical alignment with its pivot point 6a.

Another outstanding feature of this invention is that due to the disposition of the double links 7 and 8 the point 7a to which the springs 9 are attached, is accelerated or speeded up relatively to the movement of the tine, the disposition of the links being so arranged that when the tine is in its normal working position the springs have the maximum leverage for keeping it there, but as the tine is forced rearwardly by an obstruction, the spring leverage is automatically changed and reduced. This arrangement, so giving the maximum pull on the tine to keep it in its working position, also automatically reduces the pull as the tine moves backwards, thereby serving the double purpose of reducing the weight of the spring means and of preventing the uprising tine raising the whole cultivator out of the ground by the downward pressure of the raised tine on the obstruction.

I claim:

1. An agricultural tine device, comprising a tine, a support for carrying said tine, a pivot connecting said tine to said support, toggle links one of which is anchored to said tine support and the other is connected to said tine, spring means anchored to said tine support and connected to the inter-connecting pivot of said toggle links, and stop means whereby said tine is normally maintained with its point and pivot in or about vertical alignment and whereby said spring means exerts maximum pull during the initial period of displacement of said tine by an obstruction and in the later period exerts a pull which gradually decreases.

2. An agricultural tine arrangement having tine units each comprising, in combination, a tine, a support for carrying said tine, a pivot connecting said tine to said support, spring means anchored to said support, a toggle linkage anchored to said support and connected to said tine, a transmission linkage interconnecting said toggle linkage and spring means, screw means for said transmission linkage whereby the initial tension of said spring means is variable, and stop means whereby movement of said tine under the action of said spring means is limited so as normally to maintain said tine with its point and pivot in vertical alignment.

3. In a cultivator having a plurality of tines and a tine carrying frame, the combination with each tine of a separate support for carrying said tine, a pivot connecting said tine to said support, links interconnected with each other and also connected to said support and to said tine, spring means connected to said support and also connected to the interconnecting pivot of said links to normally maintain the tine at its full working depth and for returning said tine automatically to said depth after obstruction and displacement without raising said support, and means whereby said tine and support together with said spring and link means are adjustable as a unit on said tine carrying frame.

4. An agricultural tine device, comprising a tine, a support for carrying said tine, a pivot connecting said tine to said support, toggle links one of which is anchored to said tine support and the other is connected to said tine, spring means anchored to said tine support and connected to the inter-connecting pivot of said toggle links, and means whereby said tine is normally maintained with its point and pivot in or about vertical alignment.

5. An agricultural tine arrangement having front and rear tine units each comprising a tine, a support for carrying said tine, a pivot connecting said tine to said support, spring means anchored to said support, a toggle linkage anchored to said support and connected to said tine, a transmission linkage connecting said spring means to said toggle linkage intermediate to its connections to said support and tine, and means whereby movement of said tine under the action of said spring means is limited so as normally to maintain said tine with its point and pivot in vertical alignment.

6. The combination of a front tine, a rear tine, supports for carrying said tines, pivots connecting said tines to their respective supports, toggle links for said front tine one of which links is connected to said front tine and the other anchored to said front tine support, a spring anchored to the rear of said support and connected to the interconnecting pivot of said toggle links, a second pair of toggle links similar to said first-mentioned toggle links one of which said second toggle links is connected to said rear tine and the other is anchored to the rear tine support, a second spring similar to said first mentioned spring and connected to the front of said rear tine support whilst also being connected to the last-mentioned of said rear tine toggle links at a part thereof remote from the interconnecting pivot of said rear tine toggle links, and means whereby said springs are adapted normally to maintain said tines at their normal working depth and to return said tines automatically to said depth after obstruction and displacement without raising said tine support or stopping the implement.

In testimony whereof I affix my signature.
HARRY FERGUSON.